United States Patent
Martin et al.

(10) Patent No.: US 8,444,946 B2
(45) Date of Patent: May 21, 2013

(54) METHOD FOR PREPARING TALCOSE COMPOSITIONS COMPRISING SYNTHETIC MINERAL PARTICLES CONTAINING SILICON, GERMANIUM AND METAL

(75) Inventors: Francois Martin, St Foy d'Aigrefeuille (FR); Jocelyne Ferret, Toulouse (FR); Cedric Lebre, Toulouse (FR); Sabine Petit, Bonneuil Matours (FR); Olivier Grauby, Auriol (FR); Jean-Pierre Bonino, Pechabou (FR); Didier Arseguel, Deyme (FR); Alain Decarreau, Poitiers (FR); Eric Ferrage, Toulouse (FR)

(73) Assignees: Imerys Talc Europe, Toulouse (FR); Centre National de la Recherche Scientifique (C.N.R.S.), Paris (FR)

( * ) Notice: Subject to any disclaimer, the term of this patent is extended or adjusted under 35 U.S.C. 154(b) by 1039 days.

(21) Appl. No.: 12/373,893

(22) PCT Filed: Jul. 13, 2007

(86) PCT No.: PCT/FR2007/001200
§ 371 (c)(1),
(2), (4) Date: Jan. 15, 2009

(87) PCT Pub. No.: WO2008/009799
PCT Pub. Date: Jan. 24, 2008

(65) Prior Publication Data
US 2009/0261294 A1    Oct. 22, 2009

(30) Foreign Application Priority Data
Jul. 17, 2006  (FR)  ..................... 06 06473

(51) Int. Cl.
*C01B 33/00*  (2006.01)
*C01B 33/24*  (2006.01)
*C01B 33/26*  (2006.01)

(52) U.S. Cl.
USPC .................... 423/324; 423/330.1; 423/331

(58) Field of Classification Search
USPC ...... 106/626; 501/2, 4; 252/182.33; 423/331, 423/324, 330.1
See application file for complete search history.

(56) References Cited

FOREIGN PATENT DOCUMENTS
DE        101 25 879        11/2002

OTHER PUBLICATIONS

F. Martin, Expermental study of Si-Ge tetrahedral solid solution in Ni-Co-Mg talcs, 1992, Thin Solid Films, 222, 189-195.*
F. Martin et al., "Experimental study of Si-Ge Tetrahedral solid solution in Ni-Co-Mg talcs", Thin Solid Films, vol. 222, 1992, XP002422974, pp. 189-195.
Alain Decarreau et al., "Syntheses et stabilite des stevensites kerolites et talcs, magnesiens et nickeliferes, entre 80 et 240 C", vol. 308, No. II, 1989, XP008075903, pp. 301-306.
International Search Report dated Dec. 28, 2007, from corresponding PCT application.

* cited by examiner

*Primary Examiner* — Ling Choi
*Assistant Examiner* — Monique Peets
(74) *Attorney, Agent, or Firm* — Young & Thompson

(57) ABSTRACT

The invention relates to a method for preparing a composition, that is a talcose composition, comprising synthetic mineral particles which contain silicon, germanium and metal, have a crystalline and lamellar structure, and are of formula $(Si_xGe_{1-x})_4M_3O_{10}(OH)_2$, wherein M is at least one divalent metal and is of formula $Mg_{y(1)}Co_{y(2)}Zn_{y(3)}Cu_{y(4)}Mn_{y(5)}Fe_{y(6)}Ni_{y(7)}Cr_{y(8)}$, and x is a real number of the interval [0; 1]. According to said method, a gel containing silicon, germanium and metal, of formula —$(Si_xGe_{1-x})_4M_3O_{11}$, n'$H_2O$—, in the liquid state, is subjected to a hydrothermal treatment over a defined period of time and at a temperature of between 300° C. and 600° C., said time and temperature being selected according to the desired particle size and structural stability for the mineral particles containing silicon, germanium and metal, to be prepared.

22 Claims, 5 Drawing Sheets

Figure 1:
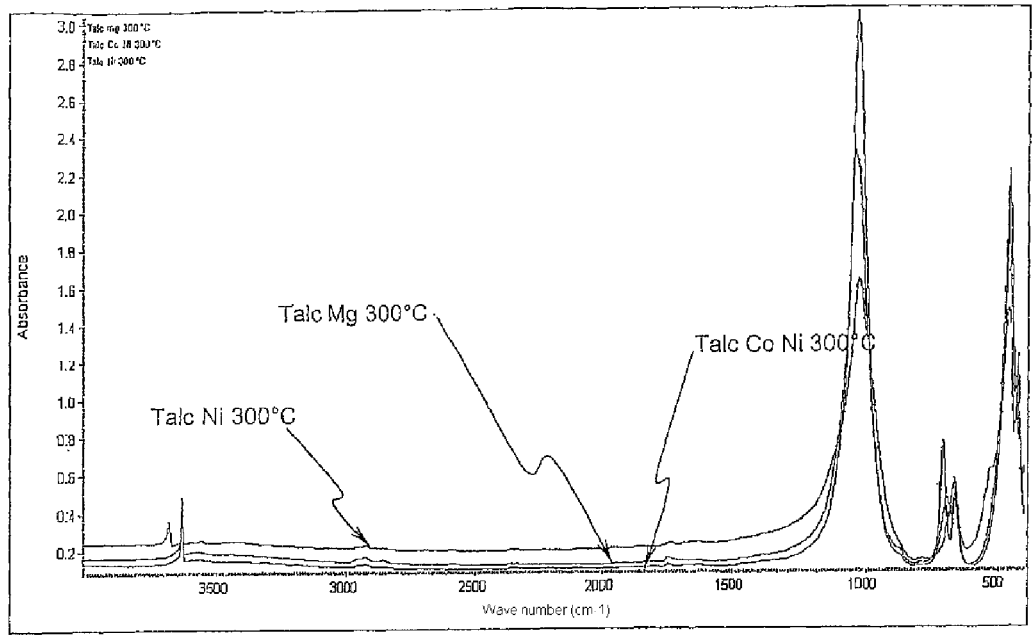

METHOD FOR PREPARING TALCOSE COMPOSITIONS COMPRISING SYNTHETIC MINERAL PARTICLES CONTAINING SILICON, GERMANIUM AND METAL

The invention relates to a method for preparing a composition, that is a talcose composition, comprising at least one synthetic mineral containing silicon, germanium and metal of formula $(Si_xGe_{1-x})_4M_3O_{10}(OH)_2$, which is in the form of particles which are chemically and structurally very similar to a natural talc. The particle size of the mineral particles, the distribution of which is substantially unimodal and monodisperse, is dependent on the particular parameters applied when the method is carried out and varies from several tens of nanometers to about ten micrometers. The invention relates also to talcose compositions which are obtained by carrying out this method and which have properties, especially mechanical and chemical properties, which are similar to, or even better than, those of natural talcs, and which can be used as a substitute for natural talcs in many applications.

Natural talc is a mineral, a hydrated magnesium silicate of formula $Si_4Mg_3O_{10}(OH)_2$, which has a structural organization in the form of superposed laminae; each lamina has a crystalline structure composed of a layer of octahedrons intercalated between two layers of inverse tetrahedrons.

Used essentially in the form of fine particles, talc is employed in many industrial sectors: thermoplastics, elastomers, paper, paints, varnishes, textiles, metallurgy, pharmaceuticals, cosmetics, phytosanitary products, fertilizers, etc., where it is incorporated into the compositions either as an inert filler (for chemical stability, for example, to dilute the active substances, expensive materials) or as a functional adjuvant (for example to correct/enhance certain mechanical or electrical properties of various materials), as a lubricant, emollient, hydrophobic agent, etc. Its considerable ability to absorb oils also opens up many perspectives in the development of novel pollution control techniques.

For many of those applications, a high purity, a high lamellarity and a fineness of the particles, as well as a narrow particle size and lamellar distribution, are desirable because they can be determinative for the quality of the end product.

However, in order to prepare a pulverulent composition from blocks of natural talc, the conventional techniques of grinding and treating the talc do not allow the above-mentioned criteria to be controlled truly accurately.

There is at present no divided solid composition of natural talc that is 100% pure; not all the particles of that composition have the chemical formula $Si_4Mg_3O_{10}(OH)_2$, which is accordingly only very theoretical. The degree of purity and the nature of the impurities (more or less high contents of Fe, Al, F, and traces of Mn, Ti, Cr, Ni, Ca, Na and/or K) of a natural talc are dependent on the parent deposit.

Likewise, the particle size (fineness and particle size distribution of the pulverulent particles) depends substantially on the mechanical grinding techniques and equipment used. The powders obtained from a natural talc by mechanical grinding generally have a particle size of the order of from several micrometers to several hundred micrometers.

As well as causing a not inconsiderable fluctuation in the particle size distribution of the particles, mechanical grinding results in a gradual and significant structural deterioration of the talc and the appearance of numerous defects in its crystalline structure. The finer the grinding, the greater the resulting alteration in the original crystalline structure.

In this connection there is known NANOTALC®, a pulverulent natural talc composition comprising particles of from 70 to 120 nm, prepared by a particularly intensive mechanical grinding method. Apart from a greatly altered crystalline structure of the mineral, as is the case with any composition prepared from a natural talc, NANOTALC® is not 100% pure.

In addition, the preparation of synthetic talcs has been the subject of theoretical and scientific studies for many years, without as yet yielding satisfactory practical results—especially results which are compatible with the quality and profitability constraints associated with use on an industrial scale.

The publication Decarreau et al., 1989 ("Synthèse et stabilité des stévensites kérolites et talcs, magnésiens and nickélifères, entre 80 et 240° C."—R. Acad. Scie. Paris—t. 308, series II, p. 301-306) mentions a method which, depending on the applied operating conditions, results in the more or less specific formation of stevensites, kerolites and/or talcs.

That method begins with the formation of an initial coprecipitate obtained by means of a reaction between a sodium metasilicate solution and a magnesium (or nickel) chloride solution. There is then obtained a highly hydrated silicometallic gel which is gelatinous in consistency and has the chemical formula: $Si_4Mg_3O_{11}$, n'$H_2O$ (or $Si_4Ni_3O_{11}$, n'$H_2O$). A series of centrifugation and washing with distilled water allows the silicometallic gel to be freed of the NaCl formed following the coprecipitation reaction.

The silicometallic gel is then subjected to forced drying, which allows the highly hydrated composition of gelatinous texture to be converted into a solid and dehydrated silicometallic composition having the chemical formula $Si_4Mg_3O_{11}.nH_2O$, n referring to the few molecules of water forming a particularly stable complex with the solid material, trapped within the pores of the solid substance (here n<<n"). The solid, dehydrated silicometallic composition is then ground/pulverized to give a fine powder, before being subjected to a hydrothermal treatment at saturation water vapour pressure. To that end, the powder is dispersed in distilled water (for example 200 mg of powder to 30 cm³). The mixture is placed in a metal autoclave (or reactor) having an inner lining of polytetrafluoroethylene (Teflon®). The duration of the hydrothermal treatment can be from two weeks to several months, and the treatment temperature can vary from 80° C. to 240° C.

That publication indicates that a hydrothermal treatment carried out for two weeks at temperatures below 100° C. would result in the formation of stevensites. At temperatures of the order of from 110 to 140° C., the treatment would yield kerolites, and at temperatures of the order of from 170 to 240° C., talcs would be obtained.

With regard to the talcs prepared by that method, retromorphosis experiments (carried out especially at 135° C.) enabled the authors of that publication to find a structural instability which manifests itself in a reduction in crystallinity and a shift towards the formation of kerolites.

The hydrothermal synthesis method as described in the publication Decarreau et al., 1989 therefore does not allow a talc composition of satisfactory quality—especially in terms of crystallinity and thermal stability—to be obtained.

An object of the invention is to propose a method for preparing a highly pure talcose composition that comprises synthetic mineral particles having a fine lamellarity and a particle size which is fine and of low dispersion, and a thermally stable crystalline structure.

An object of the invention is to propose such a method which is simple and rapid to carry out and is compatible with the constraints associated with industrial use.

It is also an object of the present invention to propose talcose compositions which can be used as a replacement for natural talc compositions in various applications. To that end, a talcose composition proposed by the invention comprises mineral particles having a crystalline and lamellar structure that is substantially very similar to the structure of a natural talc.

Another object of the invention is to propose a method which can be used to prepare not only synthetic talcs but also germanium-containing talc analogs, that is to say compounds whose crystalline structure is similar to that of natural talc but in which at least some of the $Si^{4+}$ cations of the crystal lattice have been replaced by $Ge^{4+}$ cations.

Likewise, it is an object of the invention to propose a method permitting the preparation of talcose compositions comprising particles that have particular color shades and/or electrical and/or thermal conductance properties as compared with a natural talc.

To that end, the invention relates to a method for preparing a composition, that is a talcose composition, comprising synthetic mineral particles which contain silicon, germanium and metal, have a crystalline and lamellar structure, and are of formula:

$(Si_xGe_{1-x})_4M_3O_{10}(OH)_2$, wherein M is at least one divalent metal and is of formula $Mg_{y(1)}Co_{y(2)}Zn_{y(3)}Cu_{y(4)}Mn_{y(5)}Fe_{y(6)}Ni_{y(7)}Cr_{y(8)}$; each y(i) being a real number of the interval [0; 1], such that $$\sum_{i=1}^{8} y(i) = 1;$$

y(i) refers to the following ratio:

$$\frac{\text{number of octahedral sites occupied by a metal cation } (i) \text{ in question}}{\text{total number of octahedral sites}}$$

x is a real number of the interval [0; 1]; it corresponds to the following ratio:

$$\frac{\text{number of tetrahedral sites occupied by the } Si^{4+} \text{ cations}}{\text{total number of tetrahedral sites}}$$

A method according to the invention is characterized in that a gel containing silicon, germanium and metal of formula —$(Si_xGe_{1-x})_4M_3O_{11}$, n'$H_2O$—is subjected, in the liquid state, to a hydrothermal treatment.

According to the invention, said hydrothermal treatment is carried out for a period of time and at a temperature, of from 300° C. to 600° C., that are chosen according to the particle size and structural stability desired for the mineral particles containing silicon, germanium and metal that are to be prepared.

According to the invention, the starting product containing silicon, germanium and metal, which is subjected directly to the hydrothermal treatment, is in the form of a gel, that is to say a highly hydrated substance, having a gelatinous consistency. On account of its thixotropic behavior, the gel can be rendered liquid by simple mechanical stirring.

In order to carry out the hydrothermal treatment, according to the invention, of the gel containing silicon, germanium and metal, it is possible to add additional water in order to prevent calcination of the solid fraction (the starting gel, the end product, any intermediate products). The necessity of adding water and the minimum amount of water to be added in order to avoid calcination depend substantially on the degree of hydration of the initial gel, on the treatment temperature and on the duration of the treatment.

The duration of the hydrothermal treatment, which can range from one day to several days, has a considerable influence especially on the crystallinity of the synthetic material that is ultimately obtained.

Accordingly, the invention is the result of the following essential and surprising findings:

firstly, a hydrothermal treatment carried out at relatively high temperatures (as compared with 110-240° C. as recommended in the publication Decarreau et al., 1989) of from 300° C. to 600° C. results in the formation of synthetic mineral particles having structural characteristics (especially lamellarity, crystallinity) that are very similar to those of natural talcs, and excellent thermal stability, secondly, a method according to the invention, especially in dependence on the chosen temperature, permits the synthesis, in an extremely simple manner, of synthetic mineral particles containing silicon, germanium and metal which are stable and pure and whose size and crystalline characteristics are very precisely defined and foreseeable.

Advantageously and according to the invention, the hydrothermal treatment of said gel containing silicon, germanium and metal is carried out by means of an autoclave. A steel autoclave with an inner lining of titanium or stainless steel is preferably used.

Advantageously and according to the invention, there is added to the autoclave, with said gel containing silicon, germanium and metal, an amount of water (preferably of distilled water) that is at least sufficient to create, inside the autoclave, which has been brought to the treatment temperature, a saturation vapour atmosphere.

Advantageously and according to an implementation variant of the invention, said hydrothermal treatment is carried out at a controlled pressure of the order of 16 bar.

Advantageously and according to the invention, the hydrothermal treatment is carried out with a liquefied gel containing silicon, germanium and metal which has a liquid/solid ratio of the order of 0.83; the amount of liquid being expressed in $cm^3$ and the amount of solid in grams. If necessary, an amount of water suitable for achieving that ratio may be added to said liquefied gel containing silicon, germanium and metal.

Advantageously and according to the invention, the hydrothermal treatment is carried out with stirring. To that end, it is possible, for example, to place a bar magnet inside the autoclave.

At the end of a hydrothermal treatment according to the invention there is obtained a talcose composition which is in the form of a colloidal solution comprising said synthetic mineral particles containing silicon, germanium and metal. The synthetic mineral particles, in solution in water, can either be in a state in which they are more or less individualized relative to one another or they are arranged into more or less coarse aggregates formed of elementary synthetic mineral particles which have combined with one another. The particle size of these elementary particles can vary from several tens of nanometers to about ten micrometers, depending on the temperature of the hydrothermal treatment, which temperature is chosen from 300° C. to 600° C.

Advantageously and according to the invention, a colloidal talcose composition is recovered following the hydrothermal treatment, and said colloidal talcose composition is subjected to a drying step followed by a mechanical grinding step to give a talcose composition comprising individualized mineral particles containing silicon, germanium and metal. The aggregates of the composition are thus reduced to individualized elementary particles. The particle size distribution of these elementary particles is substantially unimodal and monodisperse.

Advantageously and according to the invention, drying can be carried out by means of an oven; for example at a temperature of the order of 60° C. for at least one to two days. Grinding is advantageously carried out mechanically; for example using a mortar, preferably made of agate in order to avoid any risk of contamination of the talcose composition.

Advantageously and according to the invention, the hydrothermal treatment is carried out at a temperature of the order of 300° C., for example for a period of the order of 3 days. Elementary particles whose particle size is from 20 nm to 100 nm are then ultimately obtained.

Advantageously and according to the invention, said hydrothermal treatment is carried out at a temperature of the order of 400° C., for example for a period of the order of 1.5 days. Elementary particles whose particle size is of the order of 3 μm are then ultimately obtained.

Advantageously and according to the invention, the hydrothermal treatment is carried out at a temperature of the order of from 500° C. to 600° C. for a period of the order of one day (that is to say approximately 24 hours). The synthetic mineral particles so synthesized have a particle size ranging from several micrometers to about ten micrometers.

The invention relates also to talcose compositions so prepared, which can be either in the form of colloidal solutions comprising said synthetic particles containing silicon, germanium and metal—for example a composition of synthetic particles containing silicon, germanium and metal that are present in individualized form dispersed in a liquid—or in the form of solid dehydrated compositions in which said synthetic particles containing silicon, germanium and metal are either arranged into aggregates or dispersed as individualized elementary particles.

In particular, they are compositions in which the mineral solid particles all have the same chemical entity. In the present case they are synthetic mineral particles which contain silicon, germanium and metal and correspond to formula $(Si_xGe_{1-x})_4M_3O_{10}(OH)_2$. In that formula:

M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ being a real number of the interval $[0; 1]$, such that $$\sum_{i=1}^{8} y(i) = 1,$$

x is a real number of the interval $[0; 1]$.

In the chemical formula $(Si_xGe_{1-x})_4M_3O_{10}(OH)_2$ of a synthetic mineral containing silicon, germanium and metal which can be prepared according to the invention, Si and Ge refer to the silicon ions and/or the germanium ions which occupy the tetrahedral sites of the crystal lattice. M denotes the divalent metal cations of the octahedral sites (for example $Mg^{2+}$, $Co^{2+}$, $Mn^{2+}$, $Zn^{2+}$, $Cu^{2+}$, $Fe^{2+}$, $Ni^{2+}$ and/or $Cr^{2+}$).

Accordingly, as talcose compositions within the scope of the invention there may be mentioned, for example, synthetic talc compositions; the mineral particles then correspond to the chemical formula $Si_4Mg_3O_{10}(OH)_2$.

They can also be compositions analogous to a talc composition, for example so-called "germanium-containing" compositions, that is to say compositions comprising particles of a crystalline structure similar to that of talc but in which at least some of the $Si^{4+}$ cations of the tetrahedral sites have been replaced by $Ge^{4+}$ cations. Likewise, they can be so-called "derived" or "functionalized" compositions, for example when the magnesium ions of the octahedral sites have been replaced, in variable proportions, by other divalent cations in order to obtain particles having physical, especially optical and/or electrical, properties that are improved as compared with particles of natural talc.

Analyses carried out by X-ray diffraction and by infrared spectroscopy have demonstrated that a hydrothermal treatment according to the invention, carried out directly on a silicometallic gel of the chemical formula $Si_4Mg_3O_{11}$, n'$H_2O$ (that is to say a gel containing silicon, germanium and metal of the chemical formula $(Si_xGe_{1-x})_4M_3O_{11}$, n'$H_2O$ in which x is equal to 1 and M denotes magnesium) yields a colloidal composition of synthetic talc in which the suspended particles exhibit a high degree of similarity, in particular in terms of crystallinity and lamellarity, to a natural talc (which finding was made especially on the basis of mid-infrared transmission spectra and near-infrared diffuse reflection spectra).

These analyses have also demonstrated that the method can generally be applied to all gels containing silicon, germanium and metal that correspond to the chemical formula $(Si_xGe_{1-x})_4M_3O_{11}$, n'$H_2O$ according to the invention. That method permits the synthesis of talcose compositions comprising synthetic mineral particles containing silicon, germanium and metal of formula $(Si_xGe_{1-x})_4M_3O_{10}(OH)_2$ which also share considerable structural similarities with natural talcs. Those synthetic mineral particles containing silicon, germanium and metal have a nanometric organization in superposed laminae; each lamina has a crystalline structure composed of a layer of octahedrons (occupied by divalent metal ions: $Mg^{2+}$, $Co^{2+}$, $Zn^{2+}$, $Cu^{2+}$, $Mn^{2+}$, $Fe^{2+}$ and/or $Ni^{2+}$) intercalated between two layers of inverse tetrahedrons (occupied by the $Si^{4+}$ and/or $Ge^{4+}$ ions).

It will be noted, however, that, with regard to a synthetic talc composition prepared according to the invention (that is to say a talcose composition of formula $(S_xGe_{1-x})_4M_3O_{10}(OH)_2$ in which x is equal to 1 and M denotes magnesium), that composition differs from a natural talc composition by its purity. In a synthetic talc composition according to the invention, the mineral particles are exclusively particles of the chemical formula $Si_4Mg_3O_{10}(OH)_2$. However, there is at present no pulverulent composition prepared from natural talc that is 100% pure.

In particular, in the case of X-ray diffraction, the corresponding diffractogram exhibits a characteristic diffraction peak located at a distance of the order of 9.40-9.70 Å and corresponding to a plane (001). For a natural talc, the corresponding diffraction peak is located at a distance of the order of 9.35 Å.

Likewise, in a synthetic talc composition according to the invention, the synthetic mineral particles together exhibit a crystallinity of good quality and an extremely fine particle size, which does not exceed about ten micrometers. Advantageously, the synthetic particles containing silicon, germanium and metal of a talcose composition according to the invention have a particle size, of unimodal and monodisperse distribution, of from 10 nm to 10 μm.

However, with the current state of grinding techniques, particles having such a fineness (from 10 to 200 nm) can be obtained from a natural talc only with severe "amorphization" (reduction in crystallinity) of the product. In X-ray diffraction, such amorphization manifests itself especially in a reduction in the intensity of the characteristic diffraction peaks, which are especially the peaks located at: 9.35 Å for the plane (001), 4.55 Å for the plane (020), 3.14 Å for the plane (003) and 1.52 Å for the plane (060).

In addition to X-ray diffraction methods, infrared analyses also allow the minerals containing silicon, germanium and metal according to the invention to be identified relative to natural talcs but also relative to other phyllosilicates, such as, for example, kerolites, stevensites, smectites.

In the present case, a talcose composition according to the invention can advantageously be identified by the crystalline and lamellar structure of its synthetic mineral particles containing silicon, germanium and metal, analysis of which by X-ray diffraction yields a diffractogram having the following characteristic diffraction peaks:
  a peak located at a distance of the order of 9.40-9.68 Å, for a plane (001);
  a peak located at 4.50-4.75 Å, for a plane (020);
  a peak located at 3.10-3.20 Å, for a plane (003);
  a peak located at 1.50-1.55 Å, for a plane (060).

Advantageously and according to the invention, the diffraction peak of the plane (001) is located at a distance of the order of 9.55-9.65 Å.

In addition to the extremely fine particle size of the mineral particles, their crystalline stability, their high purity and the ability to serve as a substitute for conventional talcs in many applications, some of the talcose compositions according to the invention have the particular feature that they exhibit more or less strong color shades, which depend on the nature of the divalent metal cations ($Mg^{2+}$, $Co^{2+}$, $Zn^{2+}$, $Cu^{2+}$, $Mn^{2+}$, $Fe^{2+}$, $Ni^{2+}$, $Cr^{2+}$) and the proportion thereof in the crystal lattice.

For example, a talcose composition according to the invention is a strong green color or a pale green color when the $Ni^{2+}$ cations are preferred, at least in part, to the $Mg^{2+}$ cations (of a conventional talc) for occupying the octahedral sites of the crystal lattice.

Likewise, when the octahedral sites of the crystal lattice are occupied, at least in part, by:
  $Co^{2+}$ cations, the talcose compositions have a more or less pronounced pink color,
  $Cu^{2+}$ cations, the talcose compositions have a more or less pronounced blue color,
  $Mn^{2+}$ cations, the talcose compositions have a chocolate color,
  $Fe^{2+}$ cations, the talcose compositions have a color that varies from grey to rust,
  $Zn^{2+}$ cations, the talcose compositions have a white color,
  $Cr^{2+}$ cations, the talcose compositions have a color that varies from green to blue.

Within this context it is to be noted that, although natural talcs in rock form may exhibit varied colors (green, pink, honey, etc.), grinding thereof into fine particles yields pulverulent products that are always white. The color of a block of natural talc is, in fact, due not to colored centres specific to the chemical composition of the material but to the particular arrangement of the talc particles relative to one another; grinding into fine particles renders the whole uniform and leads to a loss of coloration.

The invention makes it possible to obtain colored talcose compositions despite the high fineness of the synthetic mineral particles of which they are composed.

Likewise, based on the same principle of replacing the $Mg^{2+}$ cations by other divalent cations, depending on the divalent cation(s) chosen to occupy the octahedral sites of the crystal lattice, a talcose composition according to the invention may differ markedly from a natural talc composition in terms of its electrical and/or thermal conductance properties.

A talcose composition according to the invention can be in "bulk" form, comprising synthetic particles containing silicon, germanium and metal that are combined with one another to form aggregates. Such a talcose composition can especially be obtained directly from a hydrothermal treatment according to the invention before undergoing a grinding sequence.

A talcose composition according to the invention can likewise and advantageously be in the form of a pulverulent and dehydrated composition of individualized synthetic particles containing silicon, germanium and metal. In view of the pulverulent nature of such particles, owing to their small particle size (from several tens of nanometers to about ten micrometers), they are advantageously brought into solution for the purposes of preservation, until they are used. Within this context, a talcose composition according to the invention is advantageously in the form of a colloidal composition.

According to a particular embodiment, the starting gel containing silicon, germanium and metal is prepared, advantageously and according to the invention, by a coprecipitation reaction between:
  a liquid composition comprising at least one saline solution selected from: a sodium metasilicate ($Na_2OSiO_2$) solution and a sodium metagermanate ($Na_2OGeO_2$) solution; the respective amounts of the two solutions being chosen to give a liquid composition having the following molar concentration ratios:

$$\frac{[Na_2OSiO_2]}{[Na_2OSiO_2]+[Na_2OGeO_2]} = x \text{ and}$$

$$\frac{[Na_2OGeO_2]}{[Na_2OSiO_2]+[Na_2OGeO_2]} = 1-x; \text{ and}$$

a solution of metal chloride(s) ($MCl_2$) comprising at least one divalent metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); with a molar concentration ratio for each of said metal chlorides such that:

$$\frac{[\text{divalent metal}]_{(i)}}{[M]_{(total)}} = y(i);$$

in the presence of a hydrochloric acid solution.
In so doing, the following chemical reaction is carried out:

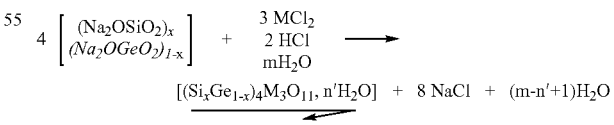

m, n' and (m−n'+1) being positive integers.

The preparation of that type of gel is known and, by way of example, the instructions given in the publication Decarreau et al., 1989 ("Synthèse et stabilité des stévensites, kérolites and talcs, magnésiens et nickélifères, entre 80 et 240° C."—R. Acad. Scie. Paris—, t. 308, series II, p. 301-306) can be followed.

Advantageously and in practice, in order to prepare the gel containing silicon, germanium and metal of formula $(Si_xGe_{1-x})_4M_3O_{11}, n'H_2O$, the following steps are carried out in succession:

- an acidic composition of metal chloride $(MCl_2, nH_2O)$ is prepared by dissolving, in one volume of water, an appropriate amount of a composition of hygroscopic crystals of at least one metal chloride selected from: magnesium chloride $(MgCl_2)$, nickel chloride $(NiCl_2)$, cobalt chloride $(COCl_2)$, zinc chloride $(ZnCl_2)$, copper chloride $(CuCl_2)$, manganese chloride $(MnCl_2)$, iron chloride $(FeCl_2)$, chromium chloride $(CrCl_2)$; then hydrochloric acid (HCl) is added thereto;
- a liquid composition is prepared by dissolving, in an appropriate volume of water, an amount of at least one salt selected from: sodium metasilicate and sodium metagermanate;
- the two aqueous compositions are mixed in chosen proportions (stoichiometry of a talc $(Si-Ge)_4/M_3$) to cause the formation of a coprecipitation gel.

The amounts of the various reagents that are employed are chosen so that the $Na^+$ and $Cl^-$ ions are present in equimolar amounts following the coprecipitation reaction. The saline solution ($Na^+$, $Cl^-$) so formed can by removed simply by carrying out a liquid/solid separation.

Once the coprecipitation has taken place, the gel containing silicon, germanium and metal is recovered, for example, by centrifugation or filtration and subjected to a hydrothermal treatment according to the invention. By recovering the coprecipitation gel in this manner, it is at the same time freed of the $Na^+$ and $Cl^-$ ions, which are particularly harmful for successful crystallization of the mineral particles containing silicon, germanium and metal.

Advantageously and according to the invention, once the coprecipitation gel has been recovered it is washed at least once with distilled water, especially in order to remove therefrom all the $Na^+$ and $Cl^-$ ions of reaction. This washing can also be carried out with osmozed water or simply with tap water.

The invention relates also to a method for preparing a talcose composition, and to a talcose composition, characterized in combination by all or some of the characteristics mentioned hereinabove or hereinbelow.

Figure 2:
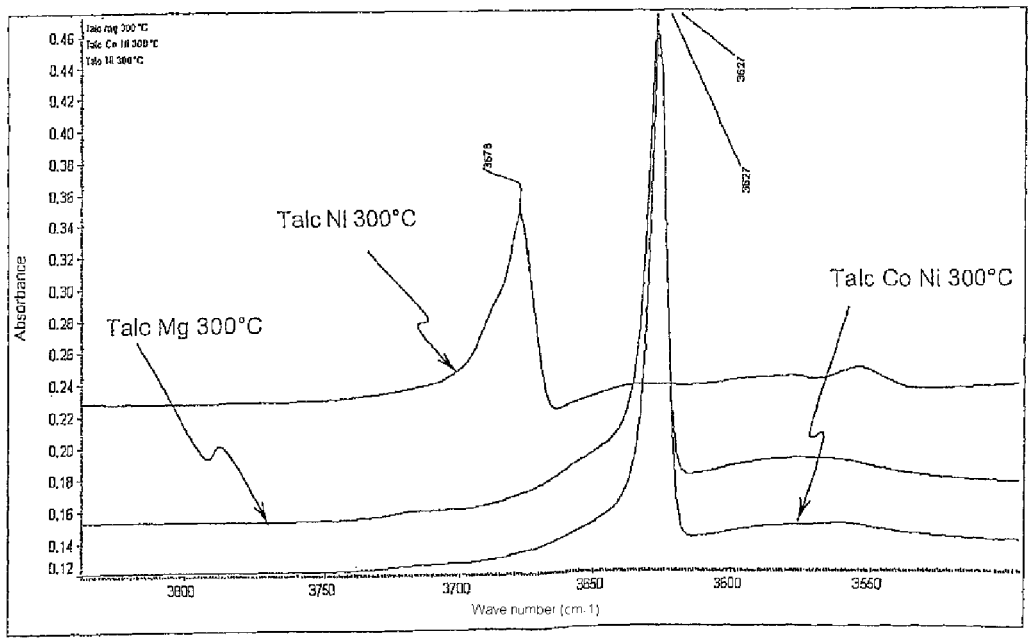
Figure 3:
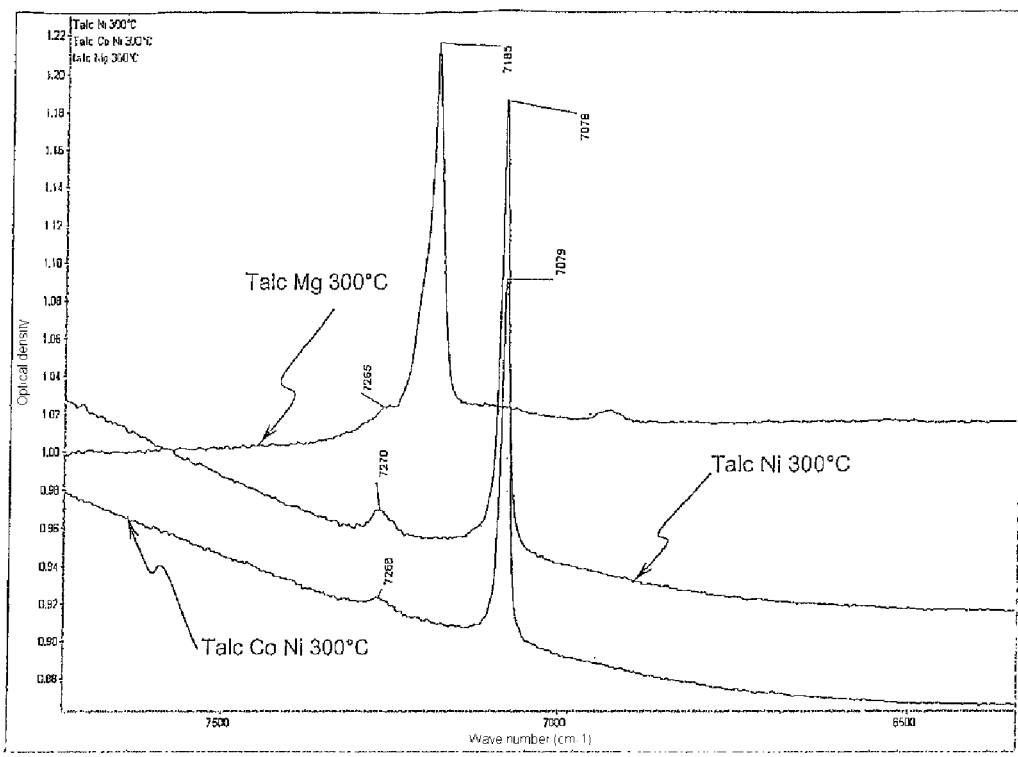
Figure 5:
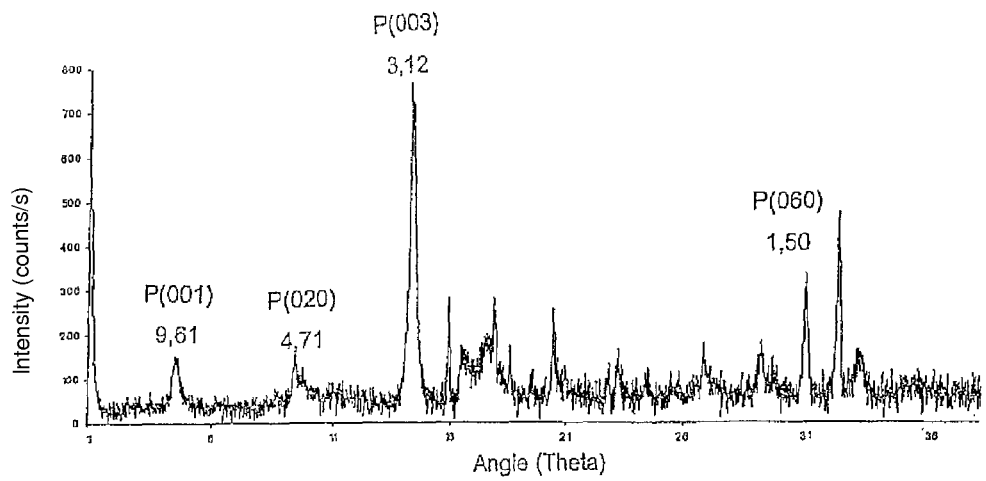
Figure 6:
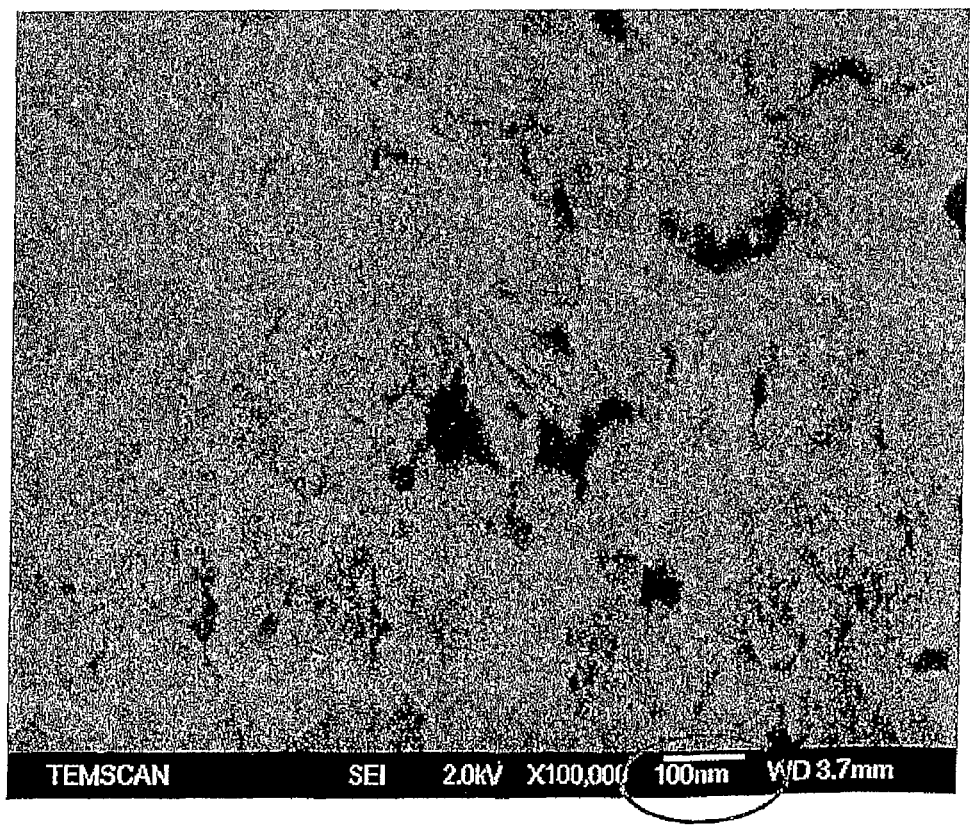

Other objects, advantages and characteristics of the invention will become apparent from reading the description and examples which follow and which refer to the accompanying figures, in which:

FIG. 1 shows three absorption spectra recorded in the mid-infrared range and corresponding to three different talcose compositions according to the invention, FIG. 2 corresponds to an enlargement of the preceding spectra in the region of the zone contained between 3850 $cm^{-1}$ and 3500 $cm^{-1}$, FIG. 3 shows the zone contained between 6000 $cm^{-1}$ and 8000 $cm^{-1}$ of three absorption spectra recorded in the near-infrared range, corresponding to the three synthetic mineral compositions mentioned above, FIGS. 4 and 5 shown the RX diffractograms corresponding to the three synthetic mineral compositions mentioned above and to a fourth particular synthetic mineral composition, FIG. 6 corresponds to a micrograph, taken by scanning electron microscopy, of a synthetic talc composition according to the invention, FIGS. 7, 8, 9a and 9b correspond to micrographs, taken by transmission electron microscopy, showing the nanometric size and the substantially unimodal and monodisperse distribution of the synthetic mineral particles of three particular compositions according to the invention.

A—GENERAL PROTOCOL FOR SYNTHESIS OF A TALCOSE COMPOSITION ACCORDING TO THE INVENTION

1—Preparation of a Gel Containing Silicon, Germanium and Metal

The gel containing silicon, germanium and metal is prepared by coprecipitation according to the following reaction equation:

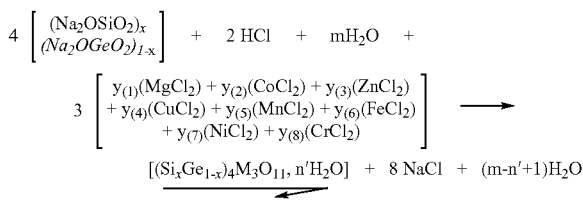

By means of this coprecipitation reaction it is possible to obtain a hydrated gel containing silicon, germanium and metal which has the stoichiometry of talc (4 Si/Ge for 3 M). It is carried out starting from:

1. an aqueous solution of penta-hydrated sodium metasilicate or an aqueous solution of sodium metagermanate, or a mixture of these two solutions in the molar proportions x:(1−x),
2. a metal chloride solution prepared with one or more metal salts (in the form of hygroscopic crystals) diluted in distilled water, and
3. a 1N hydrochloric acid solution.

The gel containing silicon, germanium and metal is prepared according to the following protocol:

1. the hydrochloric acid solution and the metal chloride solution are mixed,
2. that mixture is added to the sodium metasilicate and/or metagermanate solution; the coprecipitation gel forms instantly,
3. the gel is recovered after centrifugation (a minimum of from 3000 to 7000 revolutions per minute for 15 minutes) and removal of the supernatant (sodium chloride solution that has formed),
4. the gel is washed with distilled or osmozed water or with tap water (a minimum of two washing/centrifugation cycles is necessary).

At the end of this first phase, a highly hydrated gel containing silicon, germanium and metal $(S_xGe_{1-x})_4M_3O_{11}$, $n'H_2O$, which has a gelatinous consistency, is obtained. The gel has thixotropic behavior, that is to say it passes from a viscous state to a liquid state when it is stirred and then returns to its initial state after a certain rest period.

2—Hydrothermal Treatment of the Gel Containing Silicon, Germanium and Metal

The gel containing silicon, germanium and metal as obtained hereinbefore is subjected to a hydrothermal treatment at a temperature of from 300° C. to 600° C.

To that end:
1. the gel, in liquefied form, is placed in a reactor/autoclave; the liquid/solid ratio is optionally adjusted to a value of the order of 0.83 (the amount of liquid being expressed in cm$^3$ and the amount of solid in grams),
2. the reactor/autoclave is placed inside an oven, at the reaction temperature (established from 300° C. to 600° C.) throughout the treatment.

The inventors have found that the particle size of the particles is dependent on the temperature of the hydrothermal treatment. The lower the temperature, the smaller the synthesized particles (of the order of several tens of nanometers at 300° C., compared with about ten micrometers for a temperature of the order of 600° C.).

The inventors have also found that the crystallinity and thermal stability of the synthesized particles are dependent on the duration of the treatment. The duration of the hydrothermal treatment must be sufficient to permit conversion of the initial gelatinous mass into a crystallized and thermally stable solid material.

During the hydrothermal treatment, the gel containing silicon, germanium and metal gradually loses its gelatinous consistency and adopts a particular crystalline structure, the crystallinity of which increases with time. This gradual crystallization of the material can be detected by X-ray diffraction analysis and is shown in the corresponding diffractograms by the appearance of characteristic peaks which become sharper and intensify throughout the treatment.

The hydrothermal treatment yields a colloidal talcose composition that comprises particles containing silicon, germanium and metal suspended in water. At the end of the hydrothermal treatment:
3. the contents of the reactor are filtered in order to recover the solid phase therefrom,
4. the solid composition is dried in an oven at 60° C. for one day,
5. once dry, the solid composition is ground using an agate mortar.

There is ultimately obtained a divided solid composition, the color of which is dependent on the nature of the metal chloride(s) used in the preparation of the gel containing silicon, germanium and metal (and also, where appropriate, on the respective proportions of those metal chlorides).

B—STRUCTURAL ANALYSIS AND CHARACTERIZATION OF SOME OF THE PRODUCTS OBTAINED

Of the various talcose compositions obtained according to the protocol described above, the analysis results of only some of them are reported hereinbelow. Not only do these results confirm that it is possible by means of the invention effectively to form synthetic mineral particles having structural characteristics (especially lamellarity and crystallinity) that are very similar to those of natural talcs. They also show that, especially by the choice of temperature and implementation time, the invention permits the extremely simple synthesis of synthetic mineral particles containing silicon, germanium and metal that are stable and pure and have a size and crystalline characteristics that are defined and foreseeable.

The analyses were carried out especially by infrared transmission spectroscopy, by X-ray diffraction and by observation under an electron microscope. The collected data are shown in the accompanying figures and are commented on hereinbelow.

1—Infrared Analysis

By way of reference it is known that the characteristic vibration bands of natural talc, in infrared, are as follows (with a resolution of 4 cm$^{-1}$):
    3678 cm$^{-1}$: Mg$_3$—OH bond vibration;
    1018 cm$^{-1}$: Si—O—Si bond vibration;
    669 cm$^{-1}$: Mg—O—Si bond vibration;
    7185 cm$^{-1}$: Mg$_3$—OH bond vibration.

FIGS. 1 and 3 show the results of analyses carried out in mid-infrared and near-infrared range, respectively, on the following three talcose compositions:
    a synthetic talc composition of formula Si$_4$Mg$_3$O$_{10}$(OH)$_2$ prepared according to the method described above (with Mg$^{2+}$ as the octahedral cation) with a hydrothermal treatment at 300° C. for 3 days (in the figures this compound is denoted: Talc Mg 300° C.),
    a talcose composition of formula Si$_4$Ni$_3$O$_{10}$(OH)$_2$ prepared according to the method described above (with Ni$^{2+}$ as the octahedral cation) with a hydrothermal treatment at 300° C. for 3 days (in the figures this composition is denoted: Talc Ni 300° C.),
    a talcose composition of formula Si$_4$(Co$_{0.5}$Ni$_{0.5}$)$_3$O$_{10}$(OH)$_2$ prepared according to the method described above (with Co$^{2+}$ and Ni$^{2+}$ in equimolar proportions as the octahedral cations) with a hydrothermal treatment at 300° C. for 3 days (in the figures this composition is denoted: Talc Co Ni 300° C.).

The infrared spectra were recorded using a Nicolet 510-FTIR spectrometer over a range of 4000 to 400 cm$^{-1}$.

The spectrum obtained in mid-infrared range (FIGS. 1 and 2) shows that the synthetic talc composition—Talc Mg 300° C.—is a mineral composition that is structurally very similar to a natural talc. In particular, this is shown by the presence of the peaks representing the bond vibrations Mg$_3$—OH (3678 cm$^{-1}$), Si—O—Si (1018 cm$^{-1}$) and Mg—O—Si (669 cm$^{-1}$).

The results obtained from the measurements carried out by diffuse reflection in the near-infrared range, of which FIG. 3 shows an enlargement of the zone contained between 8000 cm$^{-1}$ and 6000 cm$^{-1}$, also show the presence of a particularly pronounced peak at 7185 cm$^{-1}$. This peak located at 7185 cm$^{-1}$ is also one of the four reference peaks of natural talcs.

The peak at 7265 cm$^{-1}$, located close to that reference peak, reflects a slight hydration of the synthetic talc particles.

With regard to the other two talcose compositions which are also given by way of example (Talc Ni 300° C./Talc Co Ni 300° C.), their infrared absorption spectra show numerous similarities with that of the synthetic talc composition (Talc Mg 300° C.), starting with the presence of four peaks which overlap or are in the immediate vicinity of the four reference peaks of a natural talc.

These similarities in the infrared spectra show that there is great structural similarity between the synthetic mineral particles of the talcose compositions according to the invention and those of a natural talc. Any shifts which can be observed for certain peaks (for example in the region of the zone contained between 7300 cm$^{-1}$ and 7000 cm$^{-1}$) are essentially the result of the difference in size between the octahedral cations of the crystal lattice.

2—X-Ray Diffraction Analyses

In X-ray diffraction, natural talc is known to have four characteristic diffraction peaks:
    for the plane (001), a peak located at a distance of 9.35 Å;
    for the plane (020), a peak located at 4.55 Å;
    for the plane (003), a peak located at 3.14 Å;
    for the plane (060), a peak located at 1.52 Å.

The RX diffractograms were recorded on a XPERT-MPD device (PanAnalytical).

The 2θ measurement step is 0.01° with an accumulation time of 2 sec/step. The acceleration voltage is 40 kV, the intensity 55 mA. The Bragg equation giving the structural equidistance is: $d_{hkl}=0.7703/\sin\theta$.

Figure 4:
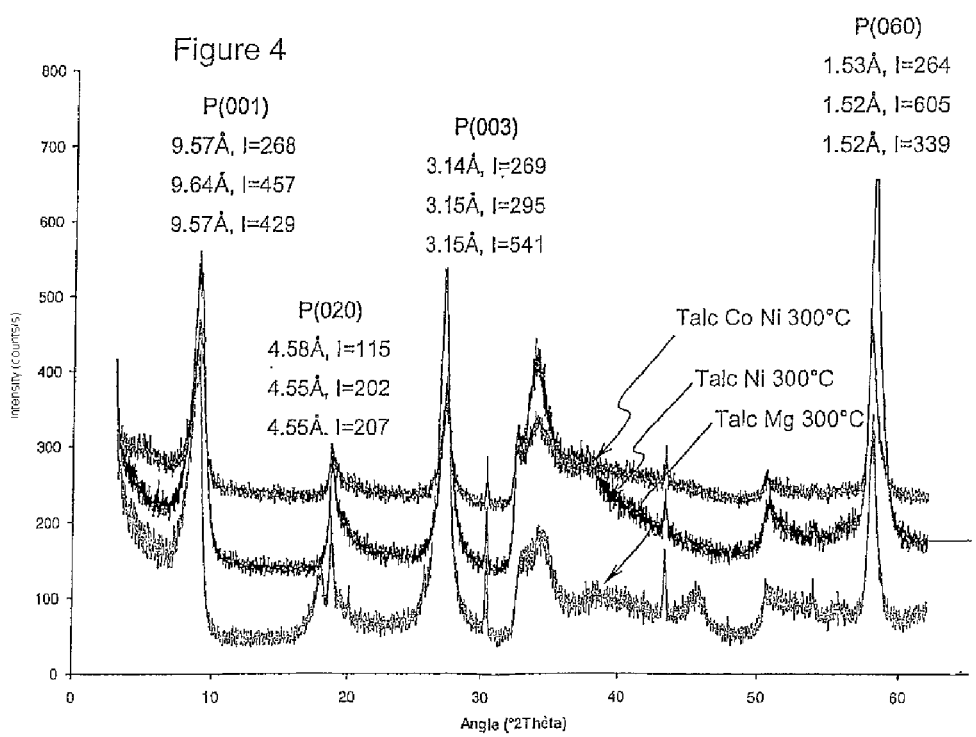

FIG. 4 shows the results of analyses carried out on the same three compositions as mentioned above:
$Si_4Mg_3O_{10}(OH)_2$, denoted: Talc Mg 300° C.,
$Si_4Ni_3O_{11}(OH)_2$, denoted: Talc Ni 300° C.,
$Si_4(Co_{0.5}Ni_{0.5})_3O_{10}(OH)_2$, denoted: Talc Co Ni 300° C.

FIG. 5 also shows an RX diffractogram of a composition $Ge_4Fe_3O_{10}(OH)_2$ prepared according to the invention.

These analyses confirm the observations made by infrared spectroscopy. There is great structural similarity between the synthetic mineral particles of the talcose compositions prepared according to the invention and the particles of natural talc.

In particular, the diffraction peaks which correspond to planes (020), (003) and (060) have positions which coincide perfectly with those of the reference diffraction peaks for natural talc.

Only the position of the diffraction peaks of plane (001) differs slightly from the position of the reference peak (9.57-9.64 Å instead of 9.35 Å). This difference in values is essentially explained by:
- a nanometric particle size, in contrast to that of natural talcs,
- a very slight residual hydration of the synthetic mineral particles, and
- optionally, the nature of the octahedral cations of the crystal lattice.

However, it must be noted that the difference resulting from the residual hydration diminishes with longer reaction times and more forced drying.

Finally, the full width at half maximum of the peaks of planes (001), (020), (003) and (060) demonstrates the good crystallinity of the mineral particles containing silicon, germanium and metal of the talcose compositions according to the invention.

It is to be noted that, for the RX diffractogram representing the particles $Ge_4Fe_3O_{10}(OH)_2$ (FIG. 5), the high intensity of the diffraction peak corresponding to plane (003) is due in part to contamination with germanium oxide.

3—Microscopic Observations and Assessment of the Particle Size of the Particles

In view of the considerable fineness of the powders of which the talcose compositions according to the invention can be constituted, the size and particle size distribution of the synthetic mineral particles composing them were assessed by observation under a field-emission scanning electron microscope and under a transmission electron microscope. The micrographs shown in FIGS. 6, 7, 8, 9a and 9b were taken during some of these observations.

Figure 7:

FIGS. 6 and 7 relate to the observation of two talcose compositions according to the invention, prepared with a hydrothermal treatment at 300° C. for a period of 3 days. In the present case, these are a synthetic talc composition of formula $Si_4Mg_3O_{10}(OH)_2$ and a talcose composition of formula $Si_4Ni_3O_{10}(OH)_2$, respectively.

In both cases it is noted that the particle size of the elementary particles varies from 20 nm to 100 nm.

Because of the density of the particles, these two photographs give the misleading impression that the particles are agglomerated with one another. In reality, the elementary particles are in an individualized state. The possibility of a certain cohesion between the particles might be explained by a certain degree of residual humidity.

Figure 8:

FIG. 8 relates to the observation of a synthetic talc composition of formula $Si_4Mg_3O_{10}(OH)_2$ obtained after hydrothermal treatment at 400° C. for a period of 30 days.

Observation of the corresponding micrograph shows that the synthetic talc particles have a particle size of the order of 3 μm.

Figure 9A:
Figure 9B:
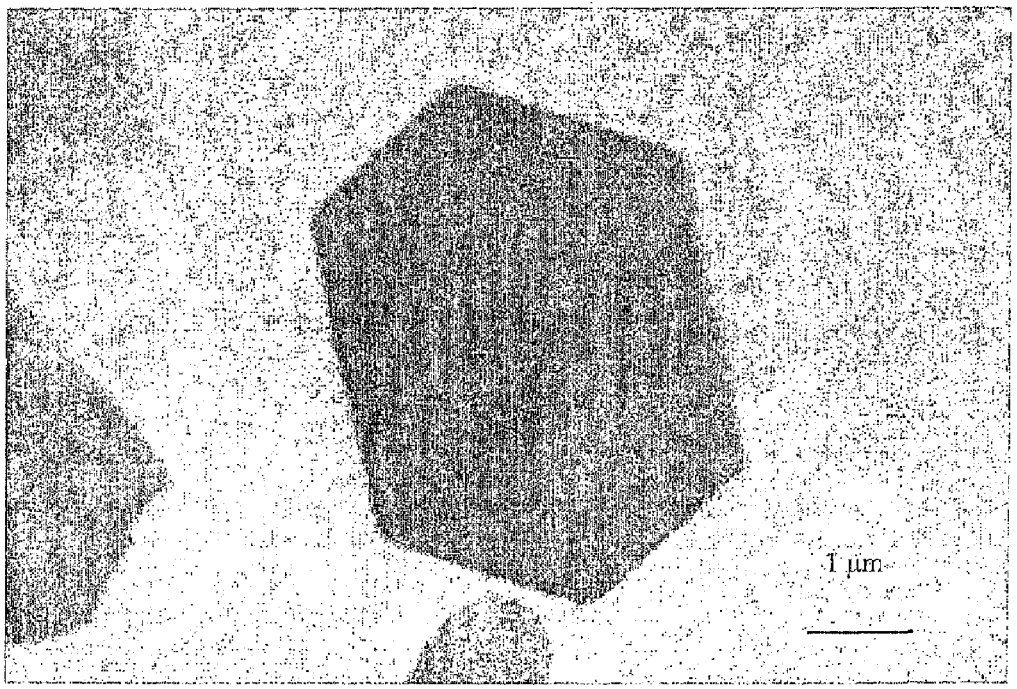

FIGS. 9a and 9b relate to the observation of a synthetic talc composition of formula $Si_4Mg_3O_{10}(OH)_2$ obtained after hydrothermal treatment at 600° C. for a period of 30 days. Observation of the two corresponding micrographs shows that the synthetic talc particles have an average size of the order of 6 μm.

The invention claimed is:

1. A method for preparing a talcose composition comprising synthetic mineral particles which have a crystalline and lamellar structure; and are of formula:

$$(Si_xGe_{1-x})_4M_3O_{10}(OH)_2,$$

wherein M is at least one divalent metal and is of formula $Mg_{y(1)}Co_{y(2)}Zn_{y(3)}Cu_{y(4)}Mn_{y(5)}Fe_{y(6)}Ni_{y(7)}Cr_{y(8)}$; each y (i) being a real number of the interval [0; 1], such that $$\sum_{i=1}^{8} y(i) = 1,$$

x is a real number of the interval [0; 1], said method comprising:
carrying out a hydrothermal treatment of a gel in the liquid state of the formula:

$$(Si_xGe_{1-x})_4M_3O_{11},n'H_2O,$$

M is at least one divalent metal and is of formula $Mg_{y(1)}Co_{y(2)}Zn_{y(3)}Cu_{y(4)}Mn_{y(5)}Fe_{y(6)}Ni_{y(7)}Cr_{y(8)}$; each y (i) being a real number of the interval [0; 1], such that $$\sum_{i=1}^{8} y(i) = 1,$$

x is a real number of the interval [0; 1], n' refers to a number of water molecules associated with said gel; said hydrothermal treatment is carried out for a period of time and at a temperature, of from 300° C. to 600° C., that are chosen according to the particle size and structural stability desired for the mineral particles that are to be prepared.

2. The method as claimed in claim 1, wherein, following said hydrothermal treatment, a colloidal talcose composition is recovered and said colloidal talcose composition is subjected to a drying step followed by a mechanical grinding step to give a talcose composition comprising individualized mineral particles.

3. The method as claimed in claim 1, wherein said gel is prepared by a coprecipitation reaction between:
a liquid composition comprising at least one saline solution selected from the group consisting of: a sodium metasilicate ($Na_2OSiO_2$) solution and a sodium metagermanate ($Na_2OGeO_2$) solution; and having the following molar concentration ratios:

$$\frac{[Na_2OSiO_2]}{[Na_2OSiO_2]+[Na_2OGeO_2]} = x \text{ and}$$

$$\frac{[Na_2OGeO_2]}{[Na_2OSiO_2]+[Na_2OGeO_2]} = 1-x; \text{ and}$$

a solution of metal chloride(s) ($MCl_2$) comprising at least one divalent metal chloride selected from the group consisting of: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), and chromium chloride ($CrCl_2$); with a molar concentration ratio for each of said metal chlorides such that:

$$\frac{[\text{divalent metal}_{(i)}]}{[M]_{(total)}} = y(i);$$

in the presence of a hydrochloric acid solution.

4. The method as claimed in claim 1, wherein the hydrothermal treatment of said gel is carried out by means of an autoclave.

5. The method as claimed in claim 1, wherein the hydrothermal treatment is carried out with a liquefied gel having a liquid/solid ratio of the order of 0.83; the amount of liquid being expressed in $cm^3$ and the amount of solid in grams.

6. The method as claimed claim 1, wherein the hydrothermal treatment is carried out at a temperature of the order of 300° C.

7. The method as claimed in claim 1, wherein the hydrothermal treatment is carried out at a temperature of the order of 400° C.

8. The method as claimed in claim 1, wherein said hydrothermal treatment is carried out at a temperature of the order of from 500° C. to 600° C.

9. The method as claimed in claim 1, wherein said hydrothermal treatment is carried out at a controlled pressure of the order of 16 bar.

10. The method as claimed in claim 1, wherein the hydrothermal treatment is carried out with stirring.

11. The method as claimed in claim 10, wherein, in order to prepare said gel of formula $(Si_xGe_{1-x})_4M_3O_{11}, n'H_2O$, the following steps are carried out in succession:
an acidic composition of metal chloride is prepared by dissolving, in one volume of water, an appropriate amount of a composition of hygroscopic crystals of at least one metal chloride selected from the group consisting of: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), and chromium chloride ($CrCl_2$); then hydrochloric acid (HCl) is added thereto;
a liquid composition is prepared by dissolving, in an appropriate volume of water, an amount of at least one salt selected from the group consisting of: sodium metasilicate and sodium metagermanate;
the two aqueous compositions are mixed in proportions chosen to cause the formation of a coprecipitation gel; the amounts of the various reagents that are employed being chosen so that the $Na^+$ and $Cl^-$ ions are present in an equimolar amount following the coprecipitation reaction.

12. The method as claimed in claim 11, wherein, before the hydrothermal treatment of said gel is carried out, the gel is washed with distilled water in order to remove therefrom the sodium chloride formed during the coprecipitation reaction.

13. A talcose composition that comprises synthetic mineral particles of formula:

in which:
M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each y (i) being a real number of the interval [0; 1], such that $$\sum_{i=1}^{8} y(i) = 1,$$

x is a real number of the interval [0; 1], wherein in an X-ray diffraction analysis of said synthetic mineral particles, a diffractogram having the following characteristic diffraction peaks is obtained:
a peak located at a distance of the order of 9.40-9.68 Å, for a plane (001);
a peak located at 4.50-4.75 Å, for a plane (020);
a peak located at 3.10-3.20 Å, for a plane (003); and
a peak located at 1.50-1.55 Å, for a plane (060).

14. The talcose composition as claimed in claim 13, wherein the diffraction peak corresponding to plane (001) is located at a distance of the order of 9.55-9.65 Å.

15. The talcose composition as claimed in claim 13, wherein said synthetic particles have a unimodal and monodisperse particle size distribution of from 10 nm to 10 µm.

16. The talcose composition as claimed in claim 13, wherein said synthetic particles are present in individualized and pulverulent form.

17. The talcose composition as claimed in claim 13, wherein said synthetic particles are present in individualized form dispersed in a liquid.

18. The talcose composition as claimed in claim 13, wherein said synthetic particles are present in a form agglomerated with one another and form aggregates.

19. The method as claimed in claim 2, wherein said gel is prepared by a coprecipitation reaction between:
a liquid composition comprising at least one saline solution selected from the group consisting of: a sodium metasilicate ($Na_2OSiO_2$) solution and a sodium metagermanate ($Na_2OGeO_2$) solution; and having the following molar concentration ratios:

$$\frac{[Na_2OSiO_2]}{[Na_2OSiO_2] + [Na_2OGeO_2]} = x \text{ and}$$

$$\frac{[Na_2OGeO_2]}{[Na_2OSiO_2] + [Na_2OGeO_2]} = 1 - x; \text{ and}$$

a solution of metal chloride(s) ($MCl_2$) comprising at least one divalent metal chloride selected from the group consisting of: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), and chromium chloride ($CrCl_2$); with a molar concentration ratio for each of said metal chlorides such that:

$$\frac{[\text{divalent metal}_{(i)}]}{[M]_{(total)}} = y(i);$$

in the presence of a hydrochloric acid solution.

20. The method as claimed in claim 2, wherein the hydrothermal treatment of said gel is carried out by means of an autoclave.

21. An industrial composition comprising a talcose composition as claimed in claim 13, wherein said industrial composition is selected from the group consisting of thermoplastics, elastomers, paper, paints, varnishes, textiles, metals, pharmaceuticals, cosmetics, phytosanitary products and fertilizers.

22. The industrial composition as claimed in claim 21, wherein said industrial composition further comprises natural talc.

\* \* \* \* \*